March 22, 1960
V. KROUPA
2,929,929
CIRCUIT ARRANGEMENT FOR REDUCING CURRENT CONSUMPTION IN DECADE SCALERS OR COUNTERS
Filed June 10, 1957
2 Sheets-Sheet 1
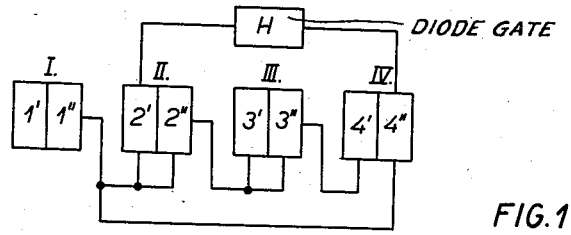
FIG.1
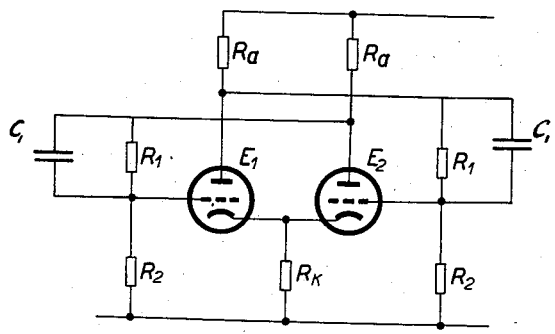
FIG.2
FIG.3
Inventor
Věnceslav Kroupa
By Richard [signature]
Ag't

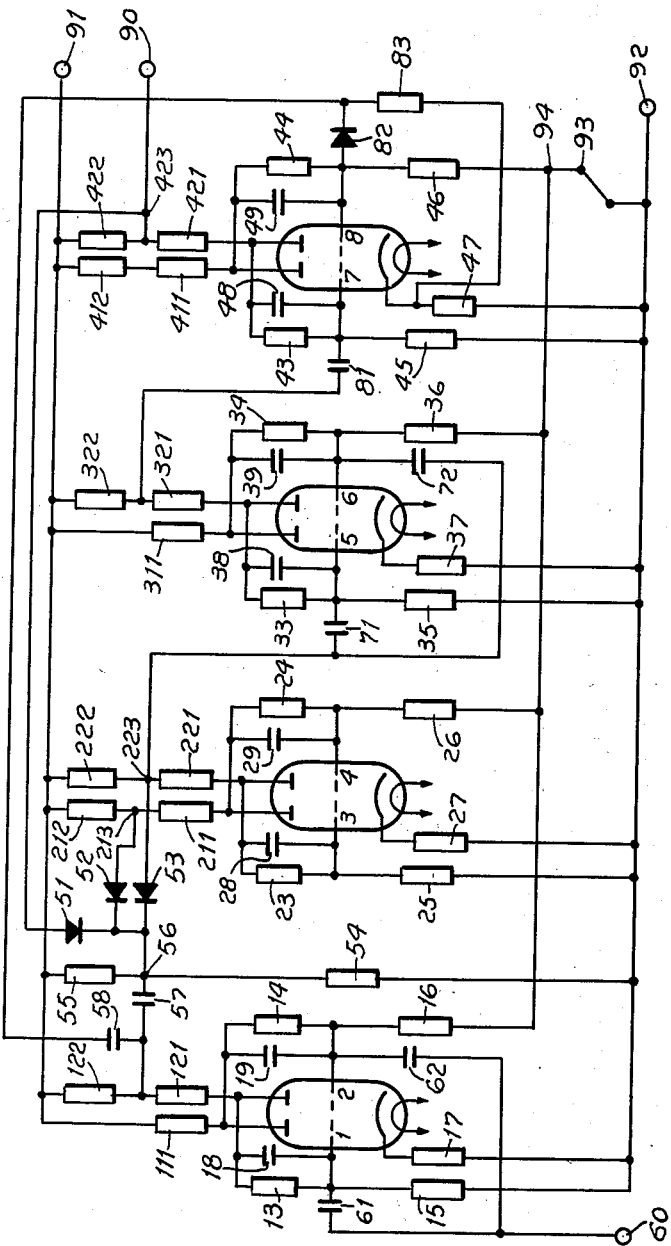

United States Patent Office 2,929,929
Patented Mar. 22, 1960

2,929,929

CIRCUIT ARRANGEMENT FOR REDUCING CURRENT CONSUMPTION IN DECADE SCALERS OR COUNTERS

Venceslav Kroupa, Prague, Czechoslovakia, assignor to Tesla, narodni podnik, Prague, Czechoslovakia Application June 10, 1957, Serial No. 664,776

2 Claims. (Cl. 250—27)

This invention relates to a novel circuit arrangement for reducing current consumption in decade scalers or counters having thermionic tubes without affecting the counting rate of the decade scaler. The counting rate is the shortest time interval required for the counting circuit to change from one stable state into a second stable state. This means that the time interval between the exciting pulses must not drop below this limit in order to achieve rapid registration of all pulses and to prevent the loss of some pulses.

A decade scaler or counter is a device with ten stable positions or states. If exciting pulses are fed into the input, the decade changes from one stable state into the other, and after the tenth exciting pulse it returns into the initial stable position. Such devices may operate on mechanical or electrical principles. They are usually supplemented by an indicating device which shows the number of received pulses.

The most important property of such decade scalers for modern applications is their counting rate. Other equally important properties are stability and reliability over a long period of time and within a wide range of feeding voltages. Further, such scalers should have the least possible current consumption, and their indication should be simple and give reliable information about the intelligence stored in the relevant stage. It is also desirable that the weight of the described counters or scalers should be conveniently low and it should be possible to quickly replace any defective stage.

Decade scalers or counters with a high counting rate and resolution which should be better than 10 μsec. are of great importance in nuclear research and in time and frequency measuring equipment. For obtaining such high counting rates, the scalers have to be equipped with thermionic tubes. A fundamental element of such a scalers is a bistable flip-flop or Eccles-Jordan trigger circuit. If several of such circuits are connected in series, the resulting scaling is binary. Thus, for example, a series of two circuits scales or divides the number of counting pulses by four, a series of three circuits divides the pulses by eight, and a series of four circuits divides the pulses by sixteen. Due to the fact that normal counting uses the decadic and not the binary system, much attention has been devoted to the problem of connecting four binary stages in such a manner that scaling by ten instead of sixteen is achieved. To this end feed-back arrangements with interposed auxiliary pulses have been used. Another method of achieving the above purpose is gating which is based on rendering some of the binary stages inoperative during a certain period of the counting cycle, and then feeding the pulses directly into further stages. It can be seen from the principles outlined above that decadic stages with the highest counting rate should be designed as gated decades. Only in such a manner it is possible to preserve the full counting rate of the resulting decade scaler corresponding to the counting rate of the individual flip-flop circuits.

It is an object of the present invention to reduce the current consumption of a decade scaler consisting of four binary flip-flop circuits.

The above, and other objects, advantages and features of the invention, will be apparent in the following detailed description of an illustrative embodiment thereof which is to be used in connection with the accompanying drawings, wherein:

Fig. 1 is a schematic diagram of a circuit rrangement embodying the invention;

Fig. 2 is a table illustrating the operation of the arrangement of Fig. 1;

Fig. 3 is a wiring diagram of a single binary flip-flop circuit; and

Fig. 4 is a wiring diagram of the circuit arrangement of Fig. 1.

In the Eccles-Jordan trigger or flip-flop circuit (Fig. 3), coupling resistors $R_1$ are connected between the anode of each of tubes $E_1$ and $E_2$ and the grid of the other of such tubes, and coupling resistors $R_2$ are connected between the grids of the tubes $E_1$ and $E_2$ and a suitable negative potential, which is conveniently the zero or ground conductor. In each of the two electrically stable states of the circuit of Fig. 3, one of the tubes $E_1$ or $E_2$ is conductive, while the other of such tubes is rendered non-conductive by a high negative potential established between its cathode and control grid through the resistors $R_1$ and $R_2$ to suppress the anode current of the non-conductive tube. By means of exciting pulses of suitable polarity, voltage and shape, and which may be supplied simultaneously to both anodes, cathodes and control grids, the anode current is suppressed in the previously conductive tube to render the latter non-conductive, while the previously non-conductive tube is opened or made conductive. If a negative or output impulse is derived from the voltage drop on the anode of the tube changing from the non-conductive state to the conductive state, it is obvious that this output impulse will occur only after two input impulses. Therefore, if the input of a bistable, flip-flop circuit is supplied with pulses having a fixed time interval therebetween, the time interval between the output impulses is always twice the time interval between the input pulses. Thus, in a certain limited period of time, the number of output impulses is equal to one-half the number of input pulses, so long as the time interval between the successive input pulses does not drop below a certain minimum value determined by transient phenomena in the circuit itself.

The highest frequency of the input pulses which an Eccles-Jordan trigger circuit illustrated in Fig. 3 can still scale or divide may be found from the following equation derived in the manner indicated by Equations 17 to 21 appearing in "Die Dimensionierung der Eccles-Jordan Schaltung" by R. Piloby, in Archiv der elektrischen Uebertragung, No. 7, 1953, pages 537–545:

$$f_{\max} = (0.13 - 0.4) \frac{I_{a2}}{C_1 \cdot \Delta U_a} \quad (1)$$

where $I_{a2}$=anode current of the conductive tube,
$\Delta U_a$=the change of anode voltage of the tube, if the conductive state of the tube is changed into the non-conductive state, and vice versa,
$C_1$=coupling capacitor from the anode of one tube to the grid of the second tube in the relevant flip-flop circuit.

It is obvious that in order to obtain the highest counting rate, the value of $C_1$ has to be as small as possible. For a given decade scaler as a whole the voltage change $\Delta U_a$ is prescribed. Hence, from the theory of flip-flop circuits it follows that their counting rate is proportional to the anode current of the tube which is conductive at any given moment.

$$f_{max} \sim I_{a2} \qquad (2)$$

By applying the same principles as in Equation 1, it is possible to determine all resistance values, that is, the values of resistor $R_a$, cathode resistor $R_k$ and coupling resistor $R_1$ or $R_2$, used in the flip-flop circuit according to Fig. 3. It can be shown that the values of all these resistors are inversely proportional to the anode current $I_{a2}$, and hence also inversely proportional to the highest frequency $f_{max}$. The current consumption of flip-flop circuits according to Fig. 3, and in which a high counting rate is required, is therefore always high.

But it has already been pointed out above that decades with as small a current consumption as possible are preferred because they make possible the use of a simpler direct current source and they reduce the heat production in the counting device which contains several decades, and heating of the circuit elements is thus reduced. This last fact is very important for two reasons: Aging of the elements is reduced so that the life of the circuit is increased, and the tolerance limits of all elements are increased which reduces production costs.

Reduction of the current consumption of a decade scaler consisting of four binary flip-flop circuits is obtained, in accordance with this invention, by providing four flip-flop circuits which are different from each other, but in which a uniform voltage is maintained on the anodes of all tubes, whether such tubes are in their conductive or non-conductive states, thereby making possible reliable indication by gas discharge tubes. The four flip-flop circuits of the decade scaler embodying the invention are interconnected in such a way that, considered as a whole, they have only ten stable electrical states, as indicated in the table of Fig. 2. This means that, after ten input pulses, the system of four bistable flip-flop circuits releases one output impulse. It will be apparent that the intervals between the exciting impulses fed to the individual flip-flop circuits forming the decade are not equal to, and may be considerably larger than the intervals between the exciting pulses fed to the input of the decade, and that the successive intervals, in each case, are assumed to be equal.

In the circuit arrangement according to the invention the anode, coupling and cathode resistors of the tubes of the successive stages of the decade have higher values than in the respective preceding stages, with the increase of such values being at the same ratio as that at which the time intervals between the exciting impulses of each of said successive flip-flop circuits are increased with respect to the time intervals between the exciting impulses supplied to the first or input flip-flop circuit of the decade counter.

The invention will be best understood by reference to the illustrative embodiment of Figs. 1 and 4 which is based on the gated circuit arrangement described by Potter. In this circuit arrangement all four stages I—IV operate in a binary system until the ninth pulse. On arrival of the tenth pulse, the fourth stage is automatically returned to its original state by the pulse arriving directly from the first stage, and the normal pulse fed from the first stage into the second stage is blocked by feed-back from the fourth stage. In the quickest operating stages this feed-back has to be provided by way of a diode gate H.

Referring to Fig. 4 in detail, it will be seen that the four binary flip-flop circuits of the decade counter or scaler, as there illustrated, have tubes 1 and 2, tubes 3 and 4, tubes 5 and 6 and tubes 7 and 8 which respectively correspond to the tubes 1' and 1", 2' and 2", 3' and 3", and 4' and 4" of Fig. 1.

The anodes of tubes 1 and 2 are connected to anode resistors 111 and 121, respectively, while the common cathode of both tubes 1 and 2 is connected to a cathode resistor 17. Further, the control grid of tube 1 is connected to the anode of tube 2 by way of a coupling resistor 13 and, similarly, the control grid of tube 2 is connected to the anode of tube 1 by way of a coupling resistor 14. It will also be seen that the control grids of tubes 1 and 2 are connected to a suitable negative potential by way of the coupling resistors 15 and 16, while coupling capacitors 18 and 19 are connected in parallel with the coupling resistors 13 and 14, respectively.

Similarly, the tubes 3 and 4 of the second stage are connected to anode resistors 211 and 221, a cathode resistor 27, coupling resistors 23, 24, 25 and 26, and coupling capacitors 28 and 29, while tubes 5 and 6 of the third stage are connected to anode resistors 311 and 321, a cathode resistor 37, coupling resistors 33, 34, 35 and 36, and coupling capacitors 38 and 39, and tubes 7 and 8 of the fourth stage are connected to anode resistors 411 and 421, a cathode resistor 47, coupling resistors 43, 44, 45 and 46, and coupling capacitors 48 and 49.

The diode gate H of Fig. 1 is represented in the detailed wiring diagram of Fig. 4 by the diodes 51, 52 and 53 and the resistors 54 and 55. The diode gate functions as follows:

So long as the tube 8 of the fourth circuit is conductive, the potential at the point 423 is lower than the potential at the point 56. Therefore, the diode 51 is closed and the gate is open because, if current passes through the tube 3, the potential at the point 223 equals the potential at the point 56. A negative impulse arriving from the first bistable flip-flop circuit can reach the point 223 by way of capacitor 57 and diode 53. Conversely, if current passes through the tube 4 of the second bistable flip-flop circuit, the negative impulse reaches the point 213 by way of the capacitor 57 and diode 52. If tube 8 of the fourth circuit is non-conductive or closed, the potential at point 423 is positive with respect to that at point 56 and, since the internal resistance of the voltage divider formed by the resistors 54 and 55 is considerably higher than the internal resistance of a voltage divider formed by the coupling resistors 43 and 45, the anode resistor 421 and an additional resistor 422, the voltage at the point 423 is practically entirely transferred to the point 56. However, this voltage transferred to the point 56 is higher than the voltages at the points 213 and 223, respectively, when the tubes 3 or 4 are non-conductive.

The operation of this circuit arrangement is illustrated in the table of Fig. 2 where the two stable states of each flip-flop circuit are designated by "O" and "X," respectively. It can be readily seen from this table that the counting rate of the second stage may be one half of the counting rate of the first stage and the counting rate of the third stage may be one fourth of the counting rate of the first stage. The fourth stage, however, must have a counting rate equal to one half of the counting rate of the first stage due to the fact that the fourth stage is controlled by the eighth pulse and by the tenth pulse. Fig. 2 also explains why stages II, III, IV may have a lower counting rate since stage II is deflected by the second, fourth, sixth, eighth, twelfth pulses, etc., stage III is deflected by the fourth, eighth, fourteenth pulses, etc., and stage IV is deflected by the eighth, tenth, eighteenth pulses, etc.

Taking into consideration that the counting rate of an Eccles-Jordan trigger or flip-flop circuit is proportional to the anode current of the conductive tube in the circuit, it can be seen that the current consumption of the decade scaler can be reduced by forming the decade scaler of binary stages having progressively reduced the counting rates, as in accordance with the present invention.

In the detailed circuit of Fig. 4 embodying the invention, the progressively reduced counting rates of the bistable flip-flop circuits are achieved by providing the anode resistors 211 and 212 and the anode resistors 221 and 222 of the second stage, and the anode resistors 411 and 412 and the anode resistors 421 and 422 of the fourth stage with values which are up to twice as high as the value of the anode resistor 111 of the first stage. Further, the value of the anode resistor 311 and the values of the anode resistors 321 and 322 of the third stage are up to four times as high as the value of the anode resistor 111 of the first tage. Similarly, the coupling resistors 23 and 24 of the second stage and the coupling resistors 43 and 44 of the fourth stage have values which are up to twice as high as the values of the coupling resistors 13 and 14 of the first stage, while the coupling resistors 33 and 34 of the third stage have values which are up to four times as high as the values of the coupling resistors 13 and 14 of the first stage. The same ratios are provided between the values of the coupling resistors 25 and 26 of the second stage, the values of the coupling resistors 35 and 36 of the third stage, and the values of the coupling resistors 45 and 46 of the fourth stage, with respect to the coupling resistors 15 and 16 of the first stage, which are all connected to the negative terminal 92 of the source of direct current supply.

The illustrated circuit also includes a contact 93 which is open only when the counting chain is to be returned to its initial or zero state where the control grids of the tubes 2, 4, 6 and 8 are at a higher potential so that the relevant circuits conduct current which corresponds to the initial state. During normal operation of the decade counter, the contact 93 is always closed so that the negative terminal 92 and the points to which the coupling resistors 16, 26, 36 and 46 are connected, as at 94, have the same potential as the points to which the coupling resistors 15, 25, 35 and 45 are connected.

It will be seen that the previously mentioned cathode resistors 17, 27, 37 and 47 are also connected to the negative terminal 92 of the source of current supply. In the circuit of Fig. 4, the input to the decade counter or scaler is indicated at 60, while the output is indicated at 90.

The exciting pulses fed to the input 60 pass to the first stage by way of capacitors 61 and 62. Capacitors 71 and 72 are interposed between the output point 223 of the second stage and the third stage, while a capacitor 81 is interposed between the output of the third stage, formed by the connecting point between the anode resistors 321 and 322, and the control grid of the tube 7 of the fourth stage. Exciting impulses are transmitted from the output of the first stage, formed between the anode resistors 121 and 122, and the control grid of tube 8 of the fourth stage by way of a capacitor 58 and a diode 82. A resistor 83 is connected between the capacitor 58 and diode 82, on the one hand, and the common cathode of tubes 7 and 8 in order to maintain the connecting point between capacitor 58 and diode 82 at the same potential as the cathode of tubes 7 and 8.

The various anode resistors of the several stages of the decade counter are all connected to the positive terminal 91 of the supply of direct current.

The circuit described above in connection with Fig. 4 is merely an example of a circuit arrangement embodying the invention, and various changes may be effected in the connections thereof without departing from the scope or spirit of the invention, except as defined in the appended claims.

What I claim is:

1. An electric decade impulse counting chain comprising a current source having positive and negative terminals; first, second, third and fourth bistable flip-flop circuits, each of said circuits including input and output tubes, anode resistors connected between the anodes of said tubes and said positive terminal of the current source, a cathode resistor connected between the cathode of each of said tubes and said negative terminal of the current source, a first group of coupling resistors connected between the anode of one of said tubes in the related circuit and the grid of the other of the tubes in said related circuit and between the anode of said other tube and the grid of said one tube in the same circuit, a second group of coupling resistors connected between said grids of the tubes and said negative terminal of the current source, and input and output channels; and cascade-connecting means extending successively between said channels of said first, second, third and fourth circuits; said anode, coupling and cathode resistors of each of said second, third and fourth bistable flip-flop circuits having values which are higher than the values of the corresponding resistors in the preceding circuit by a ratio which is, at most, equal to the ratio at which the frequency of the input pulses to each of said second, third and fourth circuits is reduced relative to the frequency of the input pulses to said first circuit.

2. An electric decade impulse counting chain as in claim 1; wherein said cascade-connecting means includes circuit means connecting the output of said first circuit to said input and output channels of said second circuit and directly to said output channel of said fourth circuit, circuit means connecting the output of said second circuit to the input and output channels of said third circuit, circuit means connecting the output of said third circuit to said input channel of said fourth circuit, and a feed-back circuit having a diode gate therein and connected between said output channel of said fourth circuit and said input channel of said second circuit; and wherein said values of the anode, coupling and cathode resistors of said second and fourth flip-flop circuits are, at most, two times higher than the values of the corresponding resistors of said first flip-flop circuit, and the values of the anode, coupling and cathode resistors of said third circuit are, at most, four times higher than said values of the corresponding resistors of the first circuit.

References Cited in the file of this patent

UNITED STATES PATENTS

| | | |
|---|---|---|
| 2,576,676 | Elbourn et al. | Nov. 27, 1951 |
| 2,627,033 | Jensen et al. | Jan. 27, 1953 |
| 2,722,601 | Piel | Nov. 1, 1955 |
| 2,749,437 | Parr | June 5, 1956 |
| 2,762,915 | Bagley | Sept. 11, 1956 |